Patented June 19, 1923.

1,459,659

UNITED STATES PATENT OFFICE.

HOWARD ELLIS, PEARLY S. HART, AND WILLIAM G. NUNNELLY, OF NEW FLORENCE, MISSOURI.

ELECTROLYTE FOR STORAGE BATTERIES.

No Drawing. Application filed November 28, 1922. Serial No. 603,855.

*To all whom it may concern:*

Be it known that we, HOWARD ELLIS, PEARLY S. HART and WILLIAM G. NUNNELLY, citizens of the United States, and residents of New Florence, in the county of Montgomery and State of Missouri, have invented a certain new and useful Improvement in Electrolytes for Storage Batteries, of which the following is a specification.

Our invention relates to storage batteries and has for its object to preserve the metal plates and thereby greatly to prolong the life of the battery, to avoid corrosion and to prevent freezing, as well as securing other advantages.

The ordinary electrolyte bath for these batteries consists of an electrolyte, namely sulfuric acid testing 1400 degrees Baumé in the case of automobile starting and lighting batteries, diluted with water.

With our invention the electrolyte may be of the ordinary kind, but we employ oil as a diluent, preferably without water.

The liquid bath, in its best proportions, consists approximately of $33\frac{1}{3}\%$ of the sulfuric acid and $66\frac{2}{3}\%$ of oil. The oil used is any good grade of mineral lubricating oil. The oil preserves the plates, prevents corrosion and acts as a non-conductor.

By way of illustration we may say that we find that by substituting this bath for the usual bath, a run-down battery that is not entirely sulfated or eaten up can be given approximately six months more service, while a new battery can be caused to last indefinitely, and the battery will not freeze because of the absence of water in the mixture. When this bath is used, it is important to employ wood separators, rather than rubber ones, in the battery. A battery provided with our proposed bath can be brought to full charge in five to eight hours, thereby saving from fifty to sixty per cent in time over usual forms. The battery, also, has been proved easier to be kept charged from the usual car generator and it is not so likely to become discharged owing to a weak generator.

What we claim as new is:

An electrolyte bath for storage batteries composed substantially of $33\frac{1}{3}\%$ of electrolyte and $66\frac{2}{3}\%$ of oil.

HOWARD ELLIS.
PEARLY S. HART.
WILLIAM G. NUNNELLY.